United States Patent [19]

Arimune et al.

[11] Patent Number: 4,751,142
[45] Date of Patent: Jun. 14, 1988

[54] MAGNETO-OPTICAL RECORDING ELEMENT

[75] Inventors: Hisao Arimune, Kokubu; Mitsuo Miyazaki, Hayato; Takashi Maeda, Kokubu, all of Japan

[73] Assignee: Kyocera Corporation, Kyoto, Japan

[21] Appl. No.: 908,272

[22] Filed: Sep. 17, 1986

[30] Foreign Application Priority Data

Sep. 18, 1985 [JP] Japan .................. 60-207462

[51] Int. Cl.$^4$ .................................................. G11B 7/24
[52] U.S. Cl. .................................... 428/336; 428/694; 428/900
[58] Field of Search ............... 428/692, 694, 336, 900; 365/122; 360/131, 134; 369/13, 288

[56] References Cited

U.S. PATENT DOCUMENTS

| | | | |
|---|---|---|---|
| 4,202,022 | 5/1980 | Imamura et al. | 360/114 |
| 4,367,257 | 1/1983 | Arai et al. | 428/220 |
| 4,467,383 | 8/1984 | Ohta et al. | 360/131 |
| 4,489,139 | 12/1984 | Ohta et al. | 428/621 |
| 4,497,006 | 1/1985 | Deguchi et al. | 360/114 |
| 4,569,881 | 2/1986 | Freese et al. | 428/213 |
| 4,615,944 | 10/1986 | Gardner | 428/332 |

FOREIGN PATENT DOCUMENTS 3317101 11/1983 Fed. Rep. of Germany .
27451 2/1982 Japan .
231386 11/1985 Japan .
113155 5/1986 Japan .
2077065 12/1981 United Kingdom .

OTHER PUBLICATIONS

Toshiichi Katayama et al., Polar Kerr Effect and Magnetic Properties of Amorphous GD-DY-FE Alloys, Association of Applied Magnetism, Oct. 26, 1979.
WPIL Abstract #83-18596k/08 regarding J58006541 of Jan. 14, 1983.

Primary Examiner—George F. Lesmes
Assistant Examiner—William M. Atkinson
Attorney, Agent, or Firm—Spensley Horn Jubas & Lubitz

[57] ABSTRACT

Disclosed is a magneto-optical recording element comprising a magnetic film composed of an alloy having a composition represented by the following formula:

$(Gd_yDy_{1-y})_xFe_{1-x}$ ($0.15 \leq x \leq 0.35$ and $0.30 \leq y \leq 0.95$)

This magnetic film is characterized in that the nuclear magnetic field, coercive force and saturation magnetic filed in the Kerr hysteresis loop are substantially same at temperatures higher than 100° C.

19 Claims, 9 Drawing Sheets

MAGNETO-OPTICAL RECORDING ELEMENT

BACKGROUND OF THE INVENTION

(1) Field of the Invention

The present invention relates to a magneto-optical recording element used for a reloadable disk or the like. More particularly, the present invention relates to a high-performance recording element which is economically advantageous and has a low cost.

(2) Description of the Prior Art

Recently, research is vigorously made on highdensity recording using a vertical recording medium or magneto-optical recording medium. According to the recording method using a magneto-optical recording medium, in order to record large quantities of informations at a high density, converged laser beams are projected and the recording medium is locally heated to effect writing on bits, and reading is effected by utilizing the magnetic optical effect. An amorphous metal perpendicular magnetic anisotropy film consisting of rare earth-transition metal elements is mainly used as the recording medium.

The material of the magnetic anisotropy film should have such properties that the magnetic moment of the rare earth metal and the magnetic moment of the transition metal are stable in unparallel to each other, and requirements of amorphousness, perpendicular magnetic anisotropy, Kerr rotation angle and coercive force for the recording material should be satisfied. If only a Curie point recording material is taken into accout as the recording material from the practical viewpoint, Fe type ferrimagnetic materials are popularly used while the foregoing conditions are taken into consideration. As the rare earth element for the Fe type alloy, Gd, Tb, Dy and Ho are known, and in the transition metal system, addition of Co, Ni or the like to Fe as the indispensable component is known.

Among these rare earth element-transition metal type ferrimagnetic materials, since Tb-Fe, Tb-Co, Gd-Tb-Fe and Tb-Fe-Co systems have a high coercive force Hc, magneto-optical recording media comprising Tb as an indispensable element are most noted and many investigations are made on these magneto-optical recording media.

However, practical use of Tb involves various problems because Tb is most reactive to oxygen among heavy rare earth elements and is most expensive.

Since a perpendicular magnetic anisotropy film is easily obtained from TbFe or DyFe and a coercive force of TbFe or DyFe is large, microbits can be stably magnetized and TbFe or DyFe is fundamentally excellent as a recording medium. However, the Curie temperature is low. Namely, the Curie temperature of TbFe is about 120° C. and that of DyFe is about 70° C. Accordingly, recording can be easily accomplished by a laser of a semiconductor having a low output, but at the time of reproduction, since the Kerr rotation angle $\theta$ is small and the reproduction laser intensity should be reduced, the reproduction signal intensity is low and the performance index represented as $\sqrt{R}\theta k$ (T) (in which R stands for the reflectance of the magnetic medium) is low and the carrier-to-noise ratio (C/N) is bad. The reason why $\theta k$ is small is that $\theta k$ is substantially proportional to the sublatice magnetization Ms(TM) and as approximately represented by the Brillouin function, $\theta k$ in the vicinity of room temperature is reduced to Tc is brought close to room temperature. Addition of Gd or Co may be considered as means for elevating Tc to about 200° C. for increasing $\theta k$. However, selection of such constituent elements have not been sufficiently studied.

SUMMARY OF THE INVENTION

Under the above-mentioned background, we made research and it was found that if a GdDyFe alloy is selected as the material of a magnetic anisotropy film, there can be obtained a magneto-optical recording element which is excellent in the recording and erasing characteristics, the reproduction characteristics and the reliability and is advantageous from the economical viewpoint.

More specifically, in accordance with the present invention, there is provided a magneto-optical recording element comprising a substrate and an amorphous magnetic film formed on the substrate and having an easy magnetization axis in the direction perpendicular to the film surface, wherein the magnetic film is a film of an alloy having an atomic composition represented by the following formula:

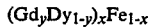

$$(Gd_yDy_{1-y})_xFe_{1-x}$$

wherein x is a number of from 0.15 to 0.35 and y is a number of from 0.30 to 0.95, and the nuclear magnetic field (Hn), coercive force (Hc) and saturation magnetic field (Hs) in the Kerr hysteresis loop are substantially same at temperatures higher than 100° C. but lower than the Curie point (Tc) of the alloy film.

DETAILED DESCRIPTION OF THE PREFERRED EMBODIMENTS

Figure 1:
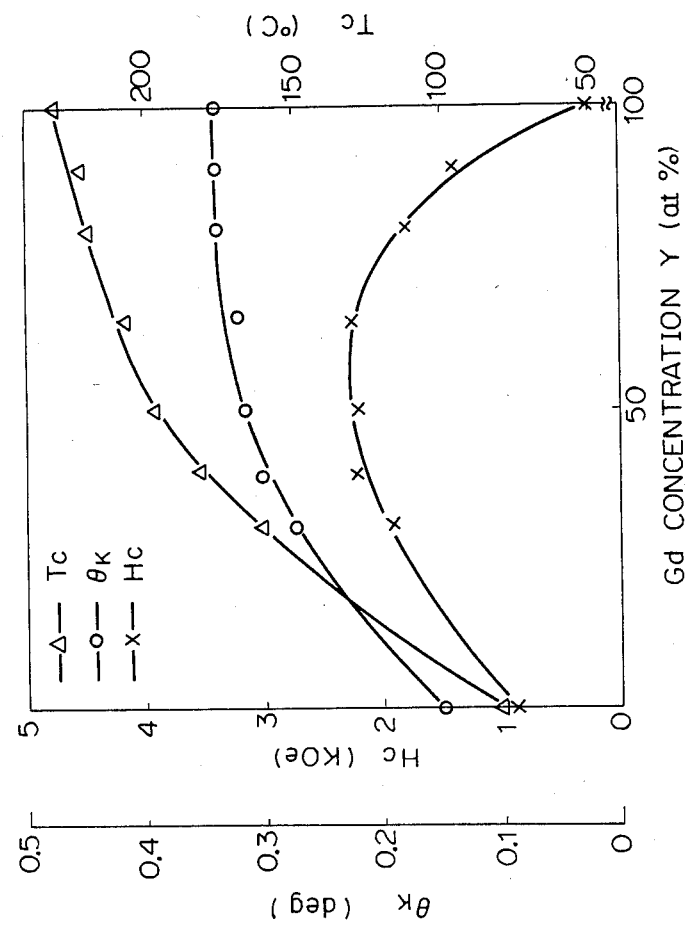
FIG. 1 is a graph illustrating the relation among the Gd concentration y, the Kerr rotation angle $\theta k$, the coercive force Hc and the Curie temperature Tc in a ternary alloy of the Gd-Dy-Fe system.

Among Fe type materials, TbFe is most popularly used as the Curie point recording material. TbFe is excellent in the magneto-optical material in that a perpendicular magnetic anisotropy film can be obtained under no bias relatively easily and the coercive force Hc is large. However, the starting material cost of Tb is more than 3 times as high as those of heavy rare earth metal elements such as Gd (gadolinium), Dy (dysprosium) and Ho (holmium) and the oxidation resistance of Tb as the element unit is poorest, and in case of alloys of Tb with transition metals, the oxidation resistance is influenced by the content of Tb and a Tb-free alloy is excellent over a Tb-containing alloy in the oxidation resistance.

In order to eliminate the above-mentioned undesirable tendencies observed in systems containing Tb as the constituent element, it is necessary to adopt an alloy system not containing Tb.

As such a system, there may be considered GdFe or DyFe in which Gd or Dy is used instead of Tb. However, GdFe is defective in that the Curie temperature Tc is relatively high and about 240° C., and the Gd concentration dependency of Tc is larger than in other alloys and it is difficult to obtain uniform characteristics over a large area. Moreover, GdFe is fatally defective in that the coercive force Hc is small and less than 0.5 KOe.

On the other hand, the Curie temperature Tc of DyFe is low and recording can be easily accomplished in case of DyFe, as pointed out hereinbefore. However, the Kerr rotation angle $\theta k$ is small and C/N is bad.

In view of the foregoing, in the present invention, it is very important that a multiple-component alloy of the GdDyFe system free of Tb should be selected for the perpendicular magnetic anisotropy film.

The perpendicular magnetic anisotropy film of the present invention has an atomic composition represented by the following formula:

$(Gd_y Dy_{1-y})_x Fe_{1-x}$ (1)

in which $0.15 \leq x \leq 0.35$ (2)

and $0.30 \leq y \leq 0.95$ (3)

In the formula (1), the value x determining the ratio of the rare earth elements to the transition metal (Fe) is set as a condition to be satisfied for obtaining a perpendicular magnetic anisotropy film. The magnetization direction and coercive force Hc observed when the value x is changed in a film of the composition $(Gd_{0.6}Dy_{0.4})_x Fe_{1-x}$ obtained by casting on a glass sheet are shown in Table A.

TABLE A

| Value X | Magnetization Direction | Coercive Force (KOe) |
|---|---|---|
| 0.12 | in-plane (//) | — |
| 0.15 | perpendicular (⊥) | 0.7 |
| 0.18 | " | 1.1 |
| 0.21 | " | 2.2 |
| 0.26 | " | >10.0 |
| 0.30 | " | 2.1 |
| 0.35 | " | 0.4 |
| 0.38 | in-plane (//) | — |

From Table A, it is seen that if the value x is controlled to form 0.15 to 0.35, a perpendicular magnetic anisotropy film can be obtained. It can also be seen that if the value x is adjusted within the range of from 0.18 to 0.33, it is possible to maintain the coercive force Hc above 1 KOe, and this range is preferred.

The value y in the formula (1), which determines the ratio between the rare earth elements is set as a factor for determining the magneto-optical characteristics such as the Kerr rotation angle $\theta k$, the coercive force Hc and the Curie temperature Tc, and the range of $0.50 \leq y \leq 0.85$ is preferred. The dependencies of these characteristics on the value y will now be described with reference to FIG. 1. FG. 1 is a diagram illustrating the dependencies of $\theta k$, Hc and Tc on the Gd concentration, that is, the value y.

From FIG. 1, it is seen that with increase of the Gd concentration y, the Curie temperature Tc tends to rise, and the Kerr rotation angle is high and substantially stable if the Gd concentration y is higher than 50 atom%. The coercive force Hc is largest if the Gd concentration y is about 50 atom%, and the coercive force is reduced if the Gd concentration y is increased or decreased from 50 atom% but the coercive force Hc is stable within a relatively broad composition ratio. In view of the foregoing tendencies, the value y is set within the above-mentioned range so as to obtain large values of $\theta k$, Hc and Tc. More specifically, if the value y exceeds 0.95, the coercive force Hc is extremely reduced, and if the value y is smaller than 0.30, the Curie temperature Tc is low and the Kerr rotation angle $\theta k$ is small, resulting in reduction of the thermal stability and reproduction characteristics.

Since the perpendicular magnetic anisotropy film of the present invention is free of Tb, it is cheap and excellent in the oxidation resistance, and the film of the present invention is excellent over an alloy film of the DyFeCo system free of Tb in dynamic characteristics such as recording and erasing characteristics and the repeated reproduction characteristics.

As is apparent from comparative examples given hereinafter, the film of the present invention is advantageous over the film of the DyFeCo system in that (1) reduction of C/N caused by reduction of the coercive force Hc is small, (2) a small bias magnetic field is sufficient for the recording, (3) a laser intensity necessary for complete erasion is small and (4) increase of the error rate by reduction of the coercive force Hc by repetition of reproduction is not caused.

The reasons why the alloy of the GdDyFe system has the above-mentioned excellent characteristics are considered to be as follows.

Figure 2:
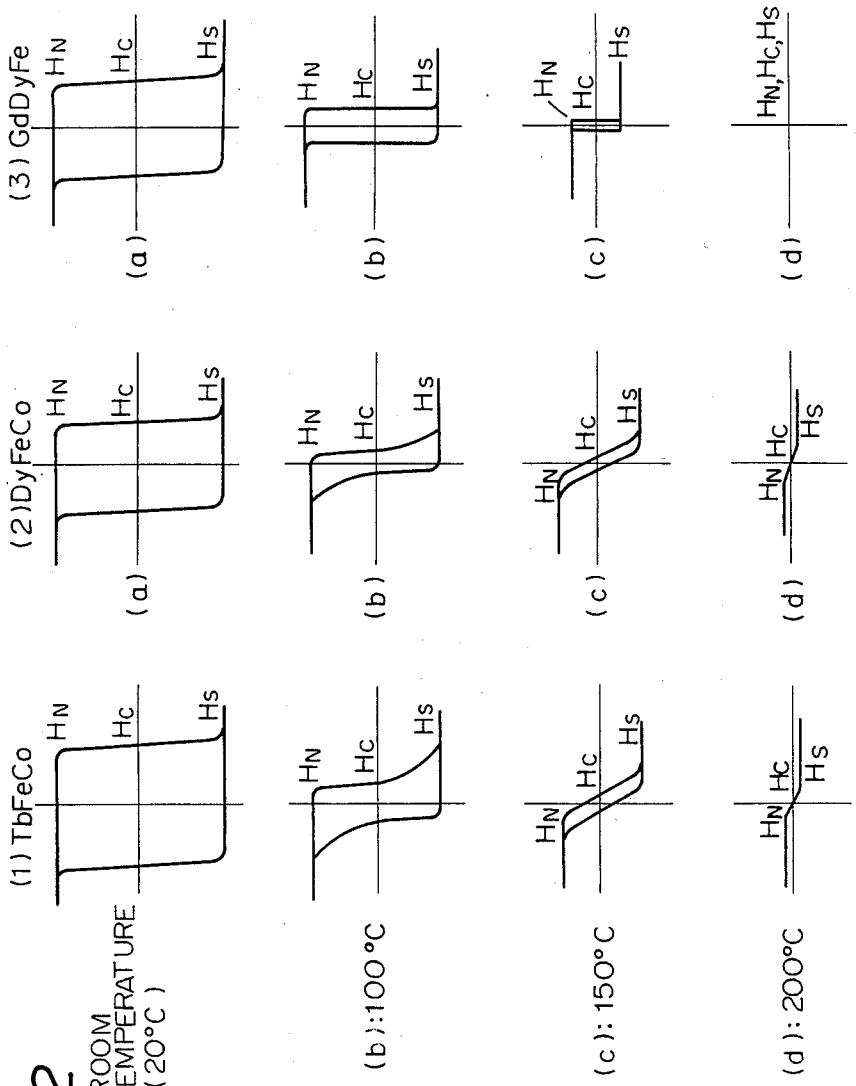
FIG. 2 is a diagram illustrating changes of shapes of Kerr hysteresis loops at room temperature (a), 100° C. (b), 150° C. (c) and 200° C. (d) in various magnetic films.

The superiority or inferiority of the magnetic recording medium has heretofore been decided based only on the magnetic characteristics at room temperature irrespectively of heat (temperature). However, the magneto-optical recording is in principle the thermal magnetic recording, and the temperature dependencies of the magnetic characteristics of the magnetic film are very important. Accordingly, with respect to Co-containing systems (TbFeCo and DyFeCo) and Co-free system (GdDyFe), the Curie temperature was set at about 200° C. and changes of shapes of Kerr hysteresis curves at room temperature (20° C.), 100° C., 150° C. and 200° C. were changed. The results are shown in FIG. 2. In FIG. 2, the Kerr rotation angle is plotted on the ordinate and the external magnetic fields (Hex) is plotted on the abscissa, and loops of TbFeCo, DyFeCo and GdDyFe are shown in (1), (2) and (3), respectively and loops at room temperature (20° C.), 100° C., 150° C. and 200° C. are shown in (a), (b), (c) and (d), respectively. In each of the Co-containing systems, the nuclear magnetic field Hn, coercive force Hc and saturation magnetic field Hs show snaky hysteresis loops as the temperature rises and the relation of $Hn \neq Hc \neq Hs$ is established, and at a temperature close to the Curie temperature, Hn is smaller than 0. On the other hand, in the Co-free system, especially the GdDyFe system used in the present invention, as the temperature rises, Hc becomes small while retaining a loop shape having a good squareness ratio and each of $\theta k$ and Hc is 0 at the Curie temperature. The loop shape at each temperature has a relation to recording and erasing at the drop of the temperature and also has a relation to reproduction at the rise of the temperature. Influences of the loop shape on the above-mentioned dynamic characteristics will now be described with reference to the principle diagrams of FIG. 3.

Figure 3:
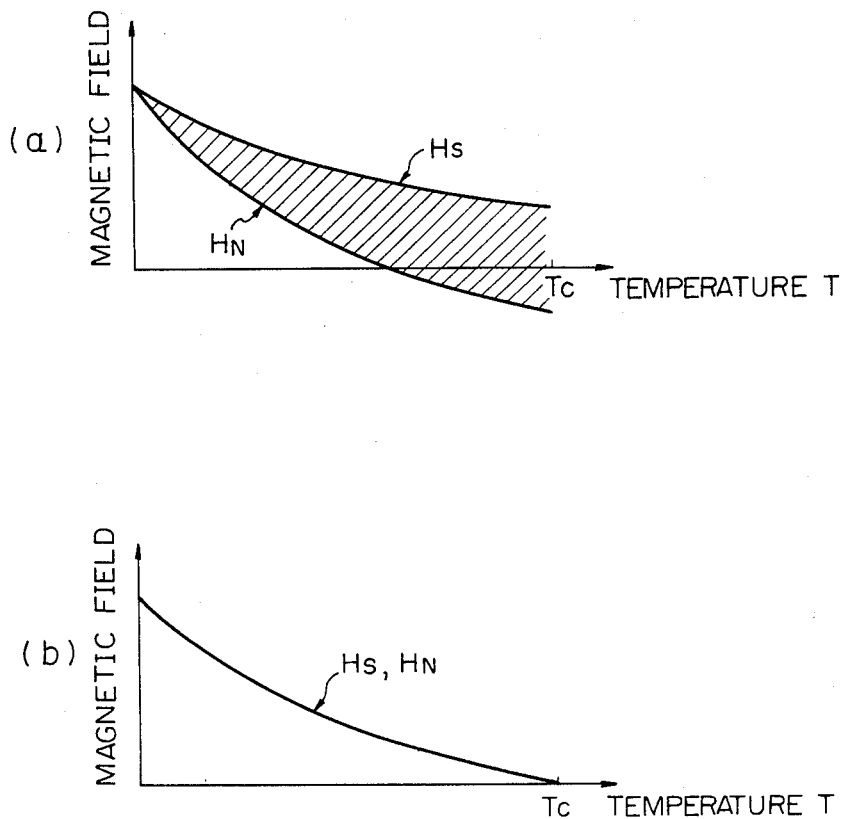
FIG. 3 shows Hs-Hn curves of a conventional magnetic film (a) and a magnetic film (b) of the present invention, in which the bias magnetic field I is plotted on the ordinate and the element-heating temperature (T) is plotted on the abscissa.

In FIGS. 3-(a) and 3-(b), the region above the Hs curve is a record-erasable region, that is, an inversion-possible region, and the region below the Hn curve is a reproduction-possible region. In the drawings, the ordinate indicates the bias magnetic field I and the abscissa indicates the temperature for heating the element by a laser.

For facilitating the understanding, the leakage magnetic field and demagnetizing field from the exterior are omitted.

In case of the Co-free magnetic anisotropy film of the present invention, as shown in FIG. 3-(b), Hn is equal to Hs even if the temperature is elevated, and therefore, inversion of the magnetization is caused simultaneously and the relation between the temperature elevation by a laser and the bias magnetic field is unconditionally decided. Accordingly, a stable condition can be simply set. In contrast, in case of the Co-containing system, as the temperature rises, Hn becomes different from Hs and simultaneous inversion of the magnetization is not attained, and under the condition included in the hatched region in FIG. 3-(a), inversion of the magnetization is incomplete and recording or erasion becomes insufficient. Furthermore, inversion of the magnetization partially occurs and repeated reproduction is not stable. In view of the above-mentioned influences of the shape of the hysteresis loop on the characteristics, it is important that in the Kerr hysteresis loop, the nuclear magnetic field Hn, coercive force Hc and saturation magnetic field Hs should be substantially same at temperatures higher than 100° C. If this condition is satisfied, recording, erasing and repeated reproduction characteristics excellent in the thermal stability in the temperature dependency of the magneto-optical recording element can be obtained.

In the magneto-optical recording, the light and magnetic field are used for the recording, and the magneto-optical recording includes a magnetic field modulation method in which a signal is converted to an inversed magnetic field and recorded and a laser beam modulation recording method in which a signal is converted to an on-and-off light and recorded. The magnetic field modulation method is characteristic in that a laser beam is continuously applied and a signal is recorded by inversion of the magnetic field caused by the exterior and therefore, overwriting is possible as in the conventional magnetic recording media.

The magneto-optical recording element can be applied to either the magnetic field modulation method or the laser beam modulation recording method. It was found that a magnetic anisotropy film of an alloy in which the value x in the above-mentioned formula (1) satisfies the following condition:

$$0.23 \leq x \leq 0.35 \quad (4)$$

is especially valuable as an element for the magnetic field modulation method.

The magnetic characteristics of the GdDyFe alloy (sample 1) not satisfying the condition of the formula (4) and the GdDyFe alloy (sample 2) satisfying the condition of the formula (4) are shown in Table B.

TABLE B

|  | Sample 1 | Sample 2 |
|---|---|---|
| Composition (atom ratio) | $(Gd_{0.6}Dy_{0.4})_{0.17}Fe_{0.83}$ | $(Gd_{0.6}Dy_{0.4})_{0.30}Fe_{0.70}$ |
| Kerr Rotation Angle $\theta k$ (degrees) | 0.305 | 0.300 |
| Coercive Force Hc (KOe) | 2.1 | 2.1 |
| Magnetization Ms (emu/cm$^2$) | 145 | 160 |
| Curie Temperature Tc (°C.) | 185 | 196 |

Figure 7:
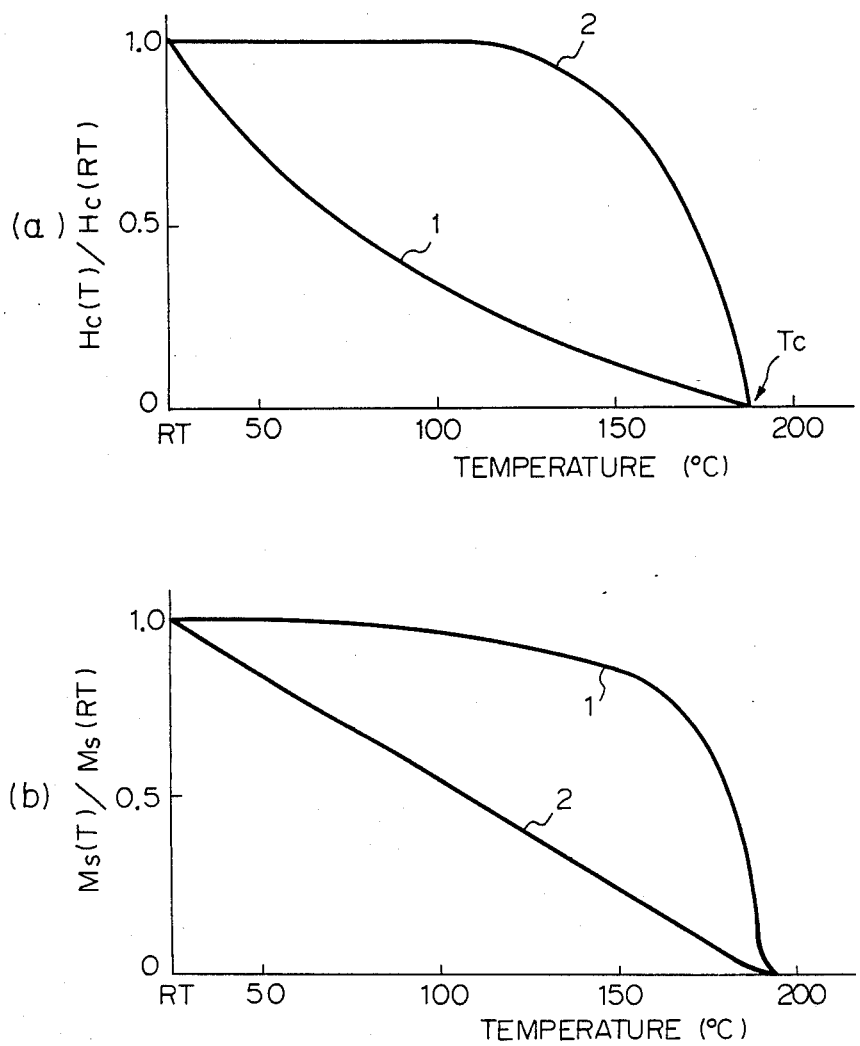
FIGS. 7-(a) and 7-(b) are diagrams showing the temperature dependencies of the coercive force Hc and magnetic moment Ms in two examples of the magnetic film according to the present invention.

Incidentally, with respect to each of the samples 1 and 2, the temperature dependencies of the coercive force Hc and the magnetic moment Ms normalized by the values at room temperature are shown in FIGS. 7-(a) and 7-(b).

In the magnetic field modulation recording method, the magnetic medium is heated at a temperature higher than the Curie point by laser beams, and when the magnetic moment is going to appear during the cooling stage, by alignment of the magnetic moment with the direction of the modulation magnetic field applied from the exterior, the magnetization direction is decided and a recording bit is formed. From FIG. 7-(a), it is seen that in the composition (sample 2) satisfying the condition of the formula (4), a larger coercive force appears more promptly during the cooling stage, and from FIG. 7-(b), it is seen that in the above-mentioned composition, since the saturation magnetic moment Ms(T) in the heated-cooled state is small, the leakage magnetic field in the direction reverse to the modulation magnetic field from the surroundings can be reduced and precise recording can be accomplished by a small modulation magnetic field from the exterior.

Figure 8:
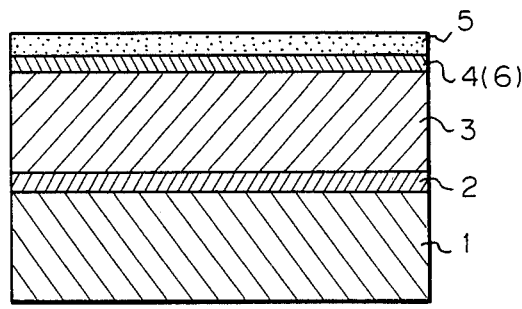
FIGS. 8 and 9 are enlarged sectional views showing examples of the sectional structure of the magneto-optical recording element of the present invention.

In the magnetic field modulation recording method, in order to further reduce the modulation magnetic field from the exterior, a layer of a high-permeability material such as Permalloy ($Ni_{78.5}Fe_{21.5}$) can be formed between the GdDyFe layer 3 and a second dielectric layer 4 in FIG. 8.

The magnetic film used in the present invention is composed of a ternary alloy of Gd, Dy and Fe, and needless to say, the alloy may contain unavoidable impurity elements. If desired, other elements may be included into the alloy so as to improve the resistance characteristics or the like of the magnetic film.

In accordance with a first preferred embodiment of the present invention, Cr as a first component and at least one element selected from the group consisting of Ti, Cu, Ag, Sb and Ni as a second component are incorporated into the ternary alloy of GdDyFe, whereby the corrosion resistance, oxidation resistance and heat resistance of the magnetic film can be further improved. Cr used in this embodiment can impart a much higher corrosion resistance to the magnetic film than other elements. The reason is that the incorporated Cr element passivates Fe oxide formed when corrosion of the magnetic film is advanced, to form an ultra-thin passivation surface film on the surface of the magnetic film, which prevents further advance of corrosion. However, we confirmed that although addition of Cr is effective for improving the corrosion resistance, this addition is fatally defective in that the magneto-optical characteristics of the recording material are reduced. More specifically, the initial characteristics of the Kerr rotation angle $\theta k$ and Curie temperature Tc are reduced.

As means for preventing this reduction of the characteristics by addition of Cr, there may be considered a method in which the amount added of Co as the Curie temperature-elevating element is increased. However, even according to this method, it was confirmed that reduction of $\theta k$ cannot completely be prevented and degradation of the reproduction characteristics cannot be avoided.

We found that if a minute amount of a composite additive comprising Cr as a first component and at least one element selected from the group consisting of Ti, Cu, Ag, Sb and Ni is incorporated into the magnetic film, good magneto-optical characteristics can be maintained for a long time while improving the corrosion resistance by addition of a minute amount of Cr.

In the present invention, it is preferred that the composite additive be incorporated in an amount smaller than 15 atom%, especially 3 to 10 atom%, based on the magnetic alloy. If the content of the composite additive exceeds 15 atom%, the magneto-optical characteristics such as the Kerr rotation angle $\theta k$ and coercive force Hc tend to be abruptly degraded.

It is preferred that the content of Cr as the first component be lower than 5 atom%, especially 0.5 to 3.0 atom%, based on the magnetic alloy. If the Cr content exceeds 5 atom%, reduction of $\theta k$ and Hc becomes conspicuous. In view of compensating the defects of Cr, it is preferred that the second component be incorporated in an amount of 3 to 15 atom% based on the magnetic alloy.

In accordance with a second preferred embodiment of the present invention, a first component selected from the group consisting of Cu and Ti and a second component selected from the group consisting of Ag, Sb and Ni are incorporated into the ternary alloy GdDyFe, whereby the enviromental resistance characteristics such as the corrosion resistance, oxidation resistance and heat resistance can be further improved.

By combining the first component selected from the group consisting of Cu and Ti with the second component selected from the group consisting of Ag, Sb and Ni, the corrosion resistance can be sufficiently improved without degradation of the magnetic characteristics. It is preferred that the first component be incorporated in an amount of 3 to 20 atom% based on the magnetic alloy, the second component be incorporated in an amount of 3 to 15 mole% based on the magnetic alloy and the total content of the first and second components be 5 to 30 atom% based on the magnetic alloy.

In accordance with a third preferred embodiment of the present invention, Si is added to the ternary alloy GdDyFe, whereby the crystallization temperature of the amorphous alloy film is elevated and the heat resistance of the magnetic film can be elevated. If the magnetic film is crystallized at a high temperature, the function of the magneto-optical recording element is lost. According to the present invention, by incorporating Si in an amount of 1 to 10 atom% based on the magnetic alloy, the crystallization temperature can be elevated by 10° to 150° C.

In the invention, the shape of the substrate on which the magnetic layer is to be formed is not particularly critical. However, the description will now be made with reference to a substrate for a recording disc hereinafter.

FIG. 8 is a sectional view showing a typical layer structure of the magneto-optical recording element according to the present invention. Referring to FIG. 8, a magnetic layer 3 is laminated on a substrate 1 for a recording disc through a first dielectric layer 2, and a second dielectric layer 4 is formed on the magnetic layer 3 and a protecting layer 5 is formed on the dielectric layer 4.

Figure 9:
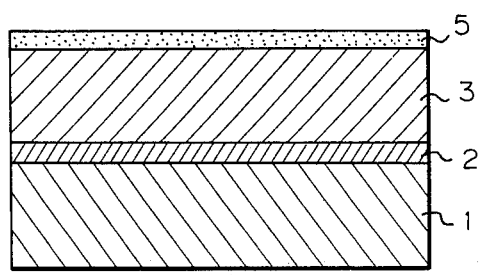

As shown in FIG. 9, the protecting layer 5 of an ultraviolet ray-curable resin may be formed directly on the surface of the magnetic layer 3 while omitting the second dielectric layer 4.

Furthermore, there may be adopted an embodiment in which a metal vacuum deposition layer 6 is formed instead of the second dielectric layer 4 and an enhancement effect is obtained by applying reproducing laser beams from the side of the substrate 1.

In the present invention, as the substrate, there may be used a known transparent substrate such as a glass sheet and a plastic substrate. If the GdDyFe alloy film of the present invention is used, prominent effects attained by using a plastic substrate composed of a polycarbonate, an epoxy resin, a polyester resin or an acrylic resin. Namley, a large coercive force Hc can be obtained. The value of Ms (magnetization) x Hc (coercive force) is increased and the stability of microbits is advantageously increased. Furthermore, even if Tb having a monoionic anisotropic energy is not used, by using a plastic substrate having a large thermal expansion coefficient, a large-capacity highdensity magneto-optical recording element can be obtained. It is considered that this is due to the effect of the stress-induced magnetic anisotropy received from the substrate during the film-forming operation.

As the dielectric layer, there can be used a non-oxide type dielectric material such as $Si_3N_4$, AlN, CrN, CrC, TiC, TiN, CdS, SiC, ZnS or $MgF_2$, an oxide type dielectric material such as $CeO_2$, $ZrO_2$, $TiO_2$, $Bi_2O_3$ or SiO, and a combination thereof. In view of the oxidation resistance, a non-oxide type dielectric material is preferred.

In FIG. 8, a metal layer 6 of Ti, Cr, Zr, Ta, Al or the like may be formed instead of the dielectric layer 4.

A known ultraviolet ray-curable acrylic resin, epoxy resin, polyester resin or acrylic urethane resin may be used for the protecting resin layer 5.

In the production of the magneto-optical recording element of the present invention, any of known means can be adopted. For example, there may be adopted vacuum evaporation deposition, sputtering, ion plating, ion injection and plating. In view of the uniformity of the composition and the reproducibility, the sputtering process is preferred.

Not only the binary sputtering method but also the single sputtering method may be adopted for formation of a ternary alloy film, if necessary by using a composite target. A Kerr enhancement layer such as a dielectric layer or a protecting layer may be similarly formed.

The fabrication method using magnetron sputtering apparatus shown in FIG. 10 will now be described in detail by way of an example.

Figure 10:
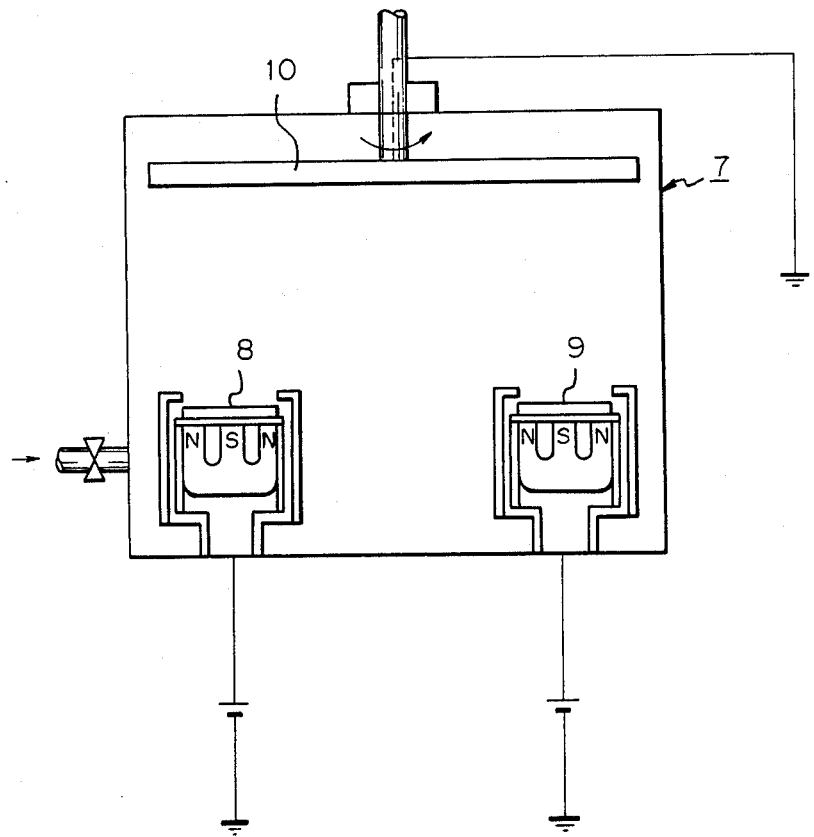
FIG. 10 is a schematic diagram illustrating an apparatus preferably used for the production of the element of the present invention.

Referring to FIG. 10, a first target 8 composed of pure iron, a second target 9 composed of an alloy of Gd and Dy and a disc-shaped substrate 10 which is rotated and driven to form a combination of films thereon are arranged within a vacuum tank 7.

Sputtering is effected between the first target 8 and the substrate 10 as well as between the second target 9 and the substrate 10.

A planar magnetron type cathode is arranged below the first and second targets 8 and 9 whereby the efficiency of ionization of the discharge gas molecules is increased by utilizing the Penning discharge effect by crossed electric and magnetic fields and a high film-forming speed suitable for mass production can be attained.

At first, the apparatus is evacuated to a high vacuum degree less than $1 \times 10^{-5}$ Torr, and a sputtering inert gas such as argon or nitrogen is introduced so that a predetermined pressure is maintained. If the pressure of the atmosphere gas is lower than $1 \times 10^{-3}$ Torr, a stable discharge state cannot be obtained and formation of a film becomes difficult. If the pressure of the atmosphere gas exceeds $50 \times 10^{-3}$ Torr, the amount of argon (Ar) or oxygen (O) contained in the magnetic film is increased and attainment of the objects of the present invention becomes difficult, and no good uniformity or stability can be obtained. Therefore, the presure of the atmosphere gas is set at $1 \times 10^{-3}$ to $50 \times 10^{-3}$ Torr, preferably $2 \times 10^{-3}$ to $20 \times 10^{-3}$ Torr.

It is preferred that the thickness of the magnetic film be 500 to 1500 Å.

The present invention will now be described in detail with reference to the following examples.

EXAMPLE 1

Samples in which the value y in the formula (1) was changed in the range of from 0 to 1.0 were prepared, and with respect to each sample, the Kerr rotation angle $\theta k$, coercive force Hc and Curie temperature Tc were measured.

More specifically, in the direct-current binary simultaneous sputtering apparatus shown in FIG. 1, a first target 8 of Fe and a second target 9 of a GdDy alloy were arranged at a predetermined ratio, and simultaneous sputtering was carried out on the targets while rotating a cathode attached to a glass substrate 10, whereby an amorphous GdDyFe perpendicular magnetic anisotropy film having a thickness of 1000 Å was prepared. The adopted conditions were a reached vacuum degree of $5 \times 10^{-7}$ Torr, an Ar gas pressure of $5 \times 10^{-3}$ Torr, a substrate-target distance of 120 mm, a substrate rotation number of 50 rpm and supplied powers of about 400 W on the side of the first target 8 and about 100 W on the side of the second target 9.

The obtained alloy had a composition of $(Gd_yDy_{1-y})_{0.215}Fe_{0.785}$, and the values of $\theta k$, Hc and Tc relative to the value y are shown in FIG. 1.

As is apparent from FIG. 1, if the value y exceeds 0.95, Hc is drastically reduced, and if the value y is smaller than 0.30, since Tc and $\theta k$ are small, the thermal stability is reduced and the reproduction characteristics are degraded.

EXAMPLE 2

The dependency of C/N on the coercive force Hc was examined as the dynamic characteristic with respect to a GdDyFe perpendicular magnetic anisotropy film and a DyFeCo perpendicular magnetic anisotropy film.

More specifically, in the same manner as described in Example 1, a Kerr enhancement layer 2 composed of $Si_3N_4$ and having a thickness of 750 Å, a perpendicular magnetic anisotropy film 3 having a thickness of 1000 Å and an ultraviolet ray-curing type epoxy resin layer were sequentially laminated on a polycarbonate substrate to form a laminate structure as shown in FIG. 9. When the C/N value was measured, results shown in FIG. 4 were obtained. The Curie temperature of each sample was adjusted to about 200° C. The Kerr rotation angle $\theta k$ and reflectance R of the magnetic layer at room temperature were adjusted to 0.315 and 54%, respectively, relatively to laser beams having a wavelength $\lambda$ of 8000 Å.

Figure 4:
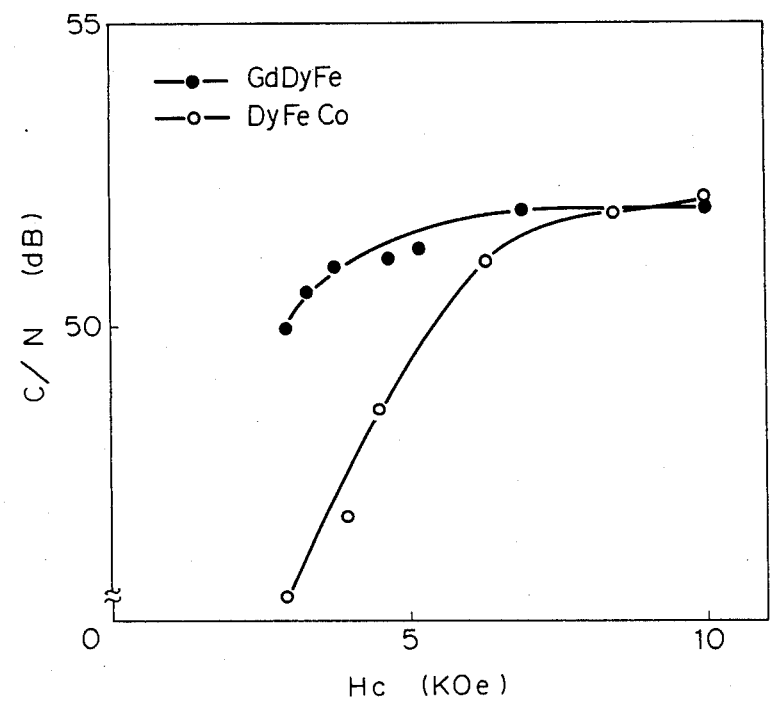
FIG. 4 is a diagram illustrating the dependency of C/N on the coercive force Hc.

From the results shown in FIG. 4, it is seen that if Hc exceeds about 7 KOe, both of the GdDyFe element and DyFeCo element show similar C/N values but if Hc is smaller than 7 KOe, the Gd/DyFe element has a larger C/N value. Namely, it is seen that the GdDyFe element of the present invention has a smaller Hc dependency and is excellent in the performance stability and reliability.

EXAMPLE 3

Figure 5:
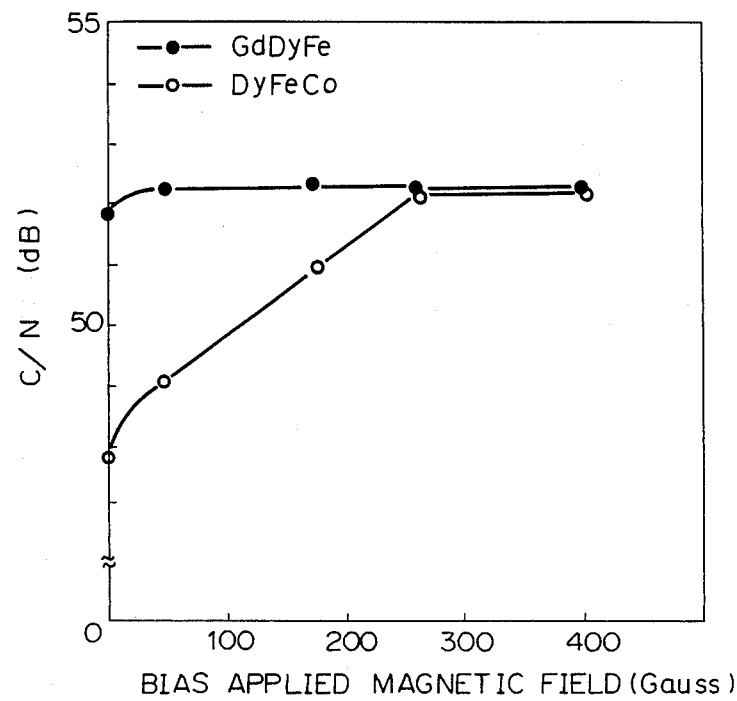
FIG. 5 is a diagram illustrating the relation between C/N and the bias applied magnetic field at the time of recording.

With respect to the GdDyFe and DyFeCo elements prepared in Example 2, the dependency of C/N on the bias magnetic field applied at the time of recording was determined as the dynamic characteristic. The obtained results are shown in FIG. 5. Each sample had a coercive force Hc of 7 KOe.

From the results shown in FIG. 5, it is seen that if the applied bias magnetic field is larger than about 250 Gauss, both of the GdDyFe and DyFeCo elements show similar C/N values but if the applied bias magnetic field is smaller than about 250 Gauss, the GdDyFe element shows a constant C/N value while the C/N value is drastically reduced in the DyFeCo element. Therefore, it is understood that when the element of the present invention is used, recording can be performed even if the applied bias magnetic field is small.

EXAMPLE 4

With respect to the GdDyFe and DyFeCo elements prepared in the same manner as described in Example 2, the complete erasion-possible linear speed was determined as the dynamic characteristic relatively to the Curie temperature of the magnetic medium.

Namely, an element having a composition giving a Curie temperature of 200° C. was prepared, and the erasion-possible linear speed was determined at a laser intensity of 5.5 mW and an applied magnetic field of 400 Gauss. The obtained results are shown in Table C.

TABLE C

| Composition | Erasion-Possible Linear Speed (m/sec) |
| --- | --- |
| $Dy_{0.26}Fe_{0.64}Co_{0.10}$ | <2.5 |
| $Gd_{0.12}Dy_{0.09}Fe_{0.79}$ | <4.4 |

From the results shown in Table C, it is understood that when the comparison is made based on the same Curie temperature of the magnetic medium, in the GdDyFe element of the present invention, the erasion can be performed at a higher speed than in the DyFeCo element. In other words, in the GdDyFe element, erasion can be performed at a smaller laser intensity at the same linear speed (rotation number). Since recording and erasion are same in the principle that magnetization is inversed, we determined an optimum recording power. It was found that if the bias magnetic field applied at the time of recording is set at 400 Gauss, the optimum recording laser power is 2.6 mW for the GdDyFe element while the optimum recording laser power is 4.2 mW for the DyFeCo element.

EXAMPLE 5

The increase of symbol errors was determined relatively to the repeated reproduction frequency as the dynamic characteristic.

In the GdDyFe and DyFeCo elements prepared in Example 2, the composition of the magnetic material was adjusted so that the coercive force Hc was 1.5 KOe. The intensity of reproduction laser beams applied to these elements was set at 1.1 mW, and the increase of symbol errors was determined. Namely, the increase of errors per 1,280,000 symbols, each symbol consisting of 8 bits, was determined. The obtained results are shown in FIG. 6.

Figure 6:
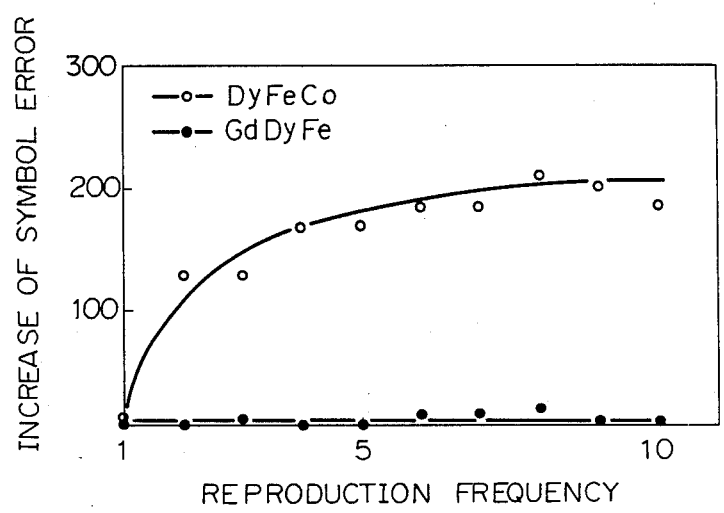
FIG. 6 is a diagraph illustrating the relation between the reproduction repetition frequency and the error increase.

From the results shown in FIG. 6, it is understood that in case of the element of the present invention, errors are not substantially increased even if reproduction is repeated and hence, the stability is good, while in case of the DyFeCo element, when Hc is small, increase of errors is observed if reproduction is repeated.

EXAMPLE 6

The difference of the coercive force Hc owing to the difference of the substrate material was examined with respect to GdDyFe and DyFeCo magnetic media.

Films were formed on a glass substrate (Glass) and a polycarbonate substrate (PC) under the same preparation conditions according to the simultaneous sputtering method. The ratio of Hc (PC) obtained when the PC substrate was used to Hc (Glass) obtained when the glass substrate was used was determined. The obtained results are shown in Table D.

TABLE D

|  | Hc(PC)/Hc(Glass) |
|---|---|
| DyFeCo Element | 1.2–2.0 |
| GdDyFe Element | 3.0–4.0 |

From the results shown in Table D, it is seen that when the PC substrate is used, the coercive force Hc is increased as compared with the coercive force attained in case of the glass substrate and this increase is conspicuous in the element of the present invention.

Examples where other additive elements were incorporated in the GdDyFe magnetic medium of the present invention will now be described.

EXAMPLE 7

Various additive elements were incorporated into the GdDyFe magnetic alloy and the corrosion resistance test was carried out.

In the direct-current binary simultaneous magnetron sputtering apparatus shown in FIG. 10, a first target 8 of Fe and a second target 9 of a GdDy alloy were arranged at a predetermined ratio. The same amounts of chips of additive elements (selected from Al, Ag, Cu, Mo, Cr, Ti Sb, Si and Ni) were placed on the respective targets to form composite targets. Sputtering was carried out while rotating a disk-shaped glass substrate 10 attached to the cathode side to form a quaternary alloy film containing 4 to 7 atom% of the additive element and having a thickness of 1500 Å. Thus, samples 1 through 10 were prepared (sample 1 contained no additive element). In the production process, the reached vacuum degree was $5 \times 10^{-7}$ Torr and the argon gas pressure was set at $5 \times 10^{-3}$ Torr.

With respect to each of the so-obtained samples, the squareness ratio of the Kerr hysteresis loop, the Kerr rotation angle $\theta k$, the coercive force Hc, the Curie temperature Tc and the corrosion resistance were determined. The obtained results are shown in Table E.

Incidentally, the squareness ratio of the Kerr hysteresis loop, the Kerr rotation angle and the coercive force were determined by using a Kerr rotation angle measuring apparatus (supplied by Nippon Bunko) and applying laser beams (wavelength = 633 nm) to the glass substrate side, and the Curie temperature was measured by a vibrating sample magnetometer. Furthermore, the atomic composition of each of the obtained alloys was determined by the ICP emission spectroscopic analysis. At the corrosion resistance test, each sample was immersed for 4 hours in artificial sweat (0.9 g of NaHPO$_4$, 0.8 g of NaCl and 0.5 g of CH$_3$COOH were dissolved in pure water to form 100 cc of a solution) and the corrosion resistance was evaluated based on the change of the section of the film according to the following scale:

O: no change

X: pitting and surface corrosion were advanced as in case of GdDyFe alloy (sample 1)

Δ: pitting was caused but surface corrosion was not caused

TABLE E

| Sample No. | Composition (atomic ratio) | Squareness Ratio of Kerr Hysteresis Loop | Kerr Rotation Angle $\theta k$ (deg) | Coercive Force Hc (KOe) | Curie Temperature Tc (°C.) | Corrosion Resistance |
|---|---|---|---|---|---|---|
| 1 | $(Gd_{0.60}Dy_{0.40})_{0.20}Fe_{0.80}$ | good | 0.315 | 2.2 | 195 | X |
| 2 | $\{(Gd_{0.60}Dy_{0.40})_{0.20}Fe_{0.80}\}_{0.94}Al_{0.06}$ | good | 0.280 | 3.8 | 196 | X |
| 3 | $\{(Gd_{0.60}Dy_{0.40})_{0.20}Fe_{0.80}\}_{0.96}Ag_{0.04}$ | good | 0.320 | 1.2 | 204 | Δ |
| 4 | $\{(Gd_{0.60}Dy_{0.40})_{0.20}Fe_{0.80}\}_{0.95}Cu_{0.05}$ | good | 0.317 | 2.2 | 195 | Δ |
| 5 | $\{(Gd_{0.60}Dy_{0.40})_{0.20}Fe_{0.80}\}_{0.95}Mo_{0.05}$ | bad | 0.105 | 3.1 | 114 | X |
| 6 | $\{(Gd_{0.60}Dy_{0.40})_{0.20}Fe_{0.80}\}_{0.93}Cr_{0.07}$ | good | 0.241 | 2.9 | 155 | O |
| 7 | $\{(Gd_{0.60}Dy_{0.40})_{0.20}Fe_{0.80}\}_{0.93}Ti_{0.07}$ | good | 0.312 | 2.1 | 193 | Δ |
| 8 | $\{(Gd_{0.60}Dy_{0.40})_{0.20}Fe_{0.80}\}_{0.94}Sb_{0.06}$ | good | 0.316 | 1.0 | 201 | Δ |
| 9 | $\{(Gd_{0.60}Dy_{0.40})_{0.20}Fe_{0.80}\}_{0.96}Si_{0.04}$ | good | 0.313 | 1.4 | 197 | X |
| 10 | $\{(Gd_{0.60}Dy_{0.40})_{0.20}Fe_{0.80}\}_{0.95}Ni_{0.05}$ | good | 0.315 | 1.4 | 199 | Δ |

As is seen from Table E, the effect of improving the corrosion resistance was prominent in samples 3, 4, 6, 7, 8 and 10 and an especially high corrosion resistance was obtained in sample 6 (Cr was added). In samples 4 and 7 (Cu or Ti was added), the Kerr rotation angle, coercive force and Curie temperature were hardly reduced as compared with those of sample 1. On the other hand, in sample 3 (Ag was added), sample 8 (Sb was added)

and sample 10 (Ni was added), the coercive force was drastically reduced.

manner as described in Example 8. The obtained results are shown in Table G.

TABLE G

| Sample No. | Composition (atomic ratio) | Squareness Ratio of Kerr Hysteresis Loop | Kerr Rotation Angle $\theta K$ (deg) | Coercive Force Hc (KOe) | Currie Temperature Tc (°C.) | Pitting Quantity (area ratio, %) |
| --- | --- | --- | --- | --- | --- | --- |
| 17 | $\{(Gd_{0.60}Dy_{0.40})_{0.20}Fe_{0.80}\}_{0.85}Cu_{0.10}Sb_{0.05}$ | good | 0.313 | 1.1 | 199 | 36 |
| 18 | $\{(Gd_{0.60}Dy_{0.40})_{0.20}Fe_{0.80}\}_{0.78}Cu_{0.16}Sb_{0.06}$ | good | 0.300 | 1.0 | 181 | 34 |
| 19 | $\{(Gd_{0.60}Dy_{0.40})_{0.20}Fe_{0.80}\}_{0.64}Cu_{0.10}Sb_{0.26}$ | bad | 0.090 | 0.1 | 175 | 29 |
| 20 | $\{(Gd_{0.60}Dy_{0.40})_{0.20}Fe_{0.80}\}_{0.65}Cu_{0.25}Sb_{0.10}$ | bad | 0.100 | 0.2 | 190 | 31 |
| 21 | $\{(Gd_{0.60}Dy_{0.40})_{0.20}Fe_{0.80}\}_{0.84}Cu_{0.10}Ag_{0.06}$ | good | 0.313 | 1.8 | 200 | 30 |
| 22 | $\{(Gd_{0.60}Dy_{0.40})_{0.20}Fe_{0.80}\}_{0.83}Cu_{0.10}Ni_{0.07}$ | good | 0.310 | 1.8 | 202 | 37 |
| 23 | $\{(Gd_{0.60}Dy_{0.40})_{0.20}Fe_{0.80}\}_{0.85}Cu_{0.05}Ti_{0.05}Sb_{0.05}$ | good | 0.308 | 1.3 | 193 | 28 |
| 24 | $\{(Gd_{0.60}Dy_{0.40})_{0.20}Fe_{0.80}\}_{0.87}Ti_{0.07}Sb_{0.06}$ | good | 0.312 | 1.1 | 197 | 32 |
| 25 | $\{(Gd_{0.60}Dy_{0.40})_{0.20}Fe_{0.80}\}_{0.87}Ti_{0.07}Ag_{0.06}$ | good | 0.308 | 1.4 | 194 | 29 |
| 26 | $\{(Gd_{0.60}Dy_{0.40})_{0.20}Fe_{0.80}\}_{0.88}Ti_{0.07}Ni_{0.05}$ | good | 0.312 | 1.6 | 198 | 32 |
| 27 | $\{(Gd_{0.60}Dy_{0.40})_{0.20}Fe_{0.80}\}_{0.87}Ti_{0.07}Ni_{0.03}Ag_{0.03}$ | good | 0.310 | 1.4 | 195 | 30 |

EXAMPLE 8

In view of the results obtained in Example 7, Cu and Ti were selected as the additive element, and the magneto-optical characteristics were determined at various amounts of the additive elements. The obtained results are shown in Table F. Incidentally, these characteristics were determined in the same manner as described in Example 7. The pitting quantity was evaluated based on the degree of expansion in the in-plane direction of the pinhole-like transparent oxide portion formed by pitting of the sample surface and was expressed by the ratio of the area of the transparent portion to the entire area. This corrosion resistance test was conducted under the same conditions as described in Example 7.

As is seen from the results shown in Table G, in samples 17, 18 and 21 through 27, an excellent corrosion resistance could be obtained as well as excellent magneto-optical characteristics. On the other hand, in sample 19, the magneto-optical characteristics were drastically reduced because of too high a content of Sb, and in sample 20, the magneto-optical characteristics were drastically reduced because of too high a content of Cu.

EXAMPLE 10

In view of the results obtained in Example 7, Cr was selected as the additive element, and the magneto-optical characteristics were determined at various amounts added of Cr. The obtained results are shown in Table H.

TABLE F

| Sample No. | Composition (atomic ratio) | Squareness Ratio of Kerr Hysteresis Loop | Kerr Rotation Angle $\theta k$ (deg) | Coercive Force Hc (KOe) | Curie Temperature Tc (°C.) | Pitting Quantity (area ratio, %) |
| --- | --- | --- | --- | --- | --- | --- |
| 1 | $(Gd_{0.60}Dy_{0.40})_{0.20}Fe_{0.80}$ | good | 0.315 | 2.2 | 195 | 100 |
| 11 | $\{(Gd_{0.60}Dy_{0.40})_{0.20}Fe_{0.80}\}_{0.94}Cu_{0.06}$ | good | 0.312 | 2.0 | 196 | 59 |
| 12 | $\{(Gd_{0.60}Dy_{0.40})_{0.20}Fe_{0.80}\}_{0.88}Cu_{0.12}$ | good | 0.306 | 1.4 | 197 | 50 |
| 13 | $\{(Gd_{0.60}Dy_{0.40})_{0.20}Fe_{0.80}\}_{0.82}Cu_{0.18}$ | good | 0.277 | 1.0 | 190 | 47 |
| 14 | $\{(Gd_{0.60}Dy_{0.40})_{0.20}Fe_{0.80}\}_{0.75}Cu_{0.25}$ | bad | 0.208 | 0.3 | 160 | 41 |
| 15 | $\{(Gd_{0.60}Dy_{0.40})_{0.20}Fe_{0.80}\}_{0.93}Ti_{0.07}$ | good | 0.310 | 1.8 | 192 | 45 |
| 16 | $\{(Gd_{0.60}Dy_{0.40})_{0.20}Fe_{0.80}\}_{0.75}Ti_{0.25}$ | bad | 0.195 | 0.2 | 156 | 28 |

TABLE H

| Sample No. | Composition (atomic ratio) | Squareness Ratio of Kerr Hysteresis Loop | Kerr Rotation Angle $\theta k$ (deg) | Coercive Force Hc (KOe) | Curie Temperature Tc (°C.) | Pitting Resistance (area ratio, %) |
| --- | --- | --- | --- | --- | --- | --- |
| 28 | $\{(Gd_{0.60}Dy_{0.40})_{0.19}Fe_{0.81}\}$ | good | 0.314 | 2.1 | 195 | 100 |
| 29 | $\{(Gd_{0.60}Dy_{0.40})_{0.21}Fe_{0.79}\}_{0.98}Cr_{0.02}$ | good | 0.302 | 2.1 | 196 | 81 |
| 30 | $\{(Gd_{0.62}Dy_{0.38})_{0.22}Fe_{0.78}\}_{0.96}Cr_{0.04}$ | good | 0.289 | 2.2 | 195 | 59 |
| 31 | $\{(Gd_{0.65}Dy_{0.35})_{0.22}Fe_{0.78}\}_{0.93}Cr_{0.07}$ | good | 0.240 | 2.3 | 193 | 29 |
| 32 | $\{(Gd_{0.65}Dy_{0.35})_{0.23}Fe_{0.77}\}_{0.90}Cr_{0.10}$ | bad | 0.210 | 2.5 | 191 | 2 |

As is apparent from the results shown in Table F, with increase of the amount added of Cu or Ti, the pitting quantity was reduced, but the Kerr rotation angle and coercive force were reduced.

EXAMPLE 9

Ag, Sb or Ni was added together with Cu or Ti imparting a high corrosion resistance, and the magneto-optical characteristics were determined in the same From the results shown in Table H, with increase of the amount added of Cr, the corrosion resistance was increased but the Kerr rotation angle was decreased.

EXAMPLE 11

Cu, Sb, Ag, Ni or Ti was added together with Cr giving a high corrosion resistance, and the magneto-optical characteristics were determined. The obtained results are shown in Table I.

TABLE I

| Sample No. | Composition (atomic ratio) | Squareness Ratio of Kerr Hysteresis Loop | Kerr Rotation Angle $\theta k$ (deg) | Coercive Force Hc (KOe) | Curie Temperature Tc (°C.) | Pitting Resistance (area ratio, %) |
| --- | --- | --- | --- | --- | --- | --- |
| 33 | $\{(Gd_{0.60}Dy_{0.40})_{0.21}Fe_{0.79}\}_{0.92}Cr_{0.02}Cu_{0.06}$ | good | 0.31 | 2.1 | 194 | 28 |

TABLE I-continued

| Sample No. | Composition (atomic ratio) | Squareness Ratio of Kerr Hysteresis Loop | Kerr Rotation Angle θk (deg) | Coercive Force Hc (KOe) | Curie Temperature Tc (°C.) | Pitting Resistance (area ratio, %) |
| --- | --- | --- | --- | --- | --- | --- |
| 34 | {(Gd$_{0.62}$Dy$_{0.38}$)$_{0.22}$Fe$_{0.78}$}$_{0.90}$Cr$_{0.04}$Cu$_{0.06}$ | good | 0.293 | 2.0 | 191 | 19 |
| 35 | {(Gd$_{0.62}$Dy$_{0.38}$)$_{0.22}$Fe$_{0.78}$}$_{0.86}$Cr$_{0.02}$Cu$_{0.12}$ | good | 0.305 | 1.8 | 190 | 23 |
| 36 | {(Gd$_{0.60}$Dy$_{0.40}$)$_{0.21}$Fe$_{0.79}$}$_{0.92}$Cr$_{0.02}$Sb$_{0.06}$ | good | 0.310 | 1.0 | 200 | 34 |
| 37 | {(Gd$_{0.40}$Dy$_{0.40}$)$_{0.21}$Fe$_{0.79}$}$_{0.92}$Cr$_{0.02}$Ag$_{0.06}$ | good | 0.302 | 1.3 | 196 | 34 |
| 38 | {(Gd$_{0.60}$Dy$_{0.49}$)$_{0.21}$Fe$_{0.79}$}$_{0.92}$Cr$_{0.02}$Ni$_{0.06}$ | good | 0.301 | 1.6 | 199 | 23 |
| 39 | {(Gd$_{0.60}$Dy$_{0.49}$)$_{0.21}$Fe$_{0.79}$}$_{0.92}$Cr$_{0.02}$Ti$_{0.06}$ | good | 0.300 | 1.9 | 190 | 21 |
| 40 | {(Gd$_{0.60}$Dy$_{0.40}$)$_{0.21}$Fe$_{0.79}$}$_{0.78}$Cr$_{0.02}$Cu$_{0.20}$ | bad | 0.155 | 0.8 | 180 | 8 |
| 41 | {(Gd$_{0.60}$Dy$_{0.40}$)$_{0.21}$Fe$_{0.79}$}$_{0.86}$Cr$_{0.08}$Cu$_{0.06}$ | bad | 0.120 | 1.5 | 165 | 0 |

As is apparent from the results shown in Table I, in samples 33 through 39, an excellent corrosion resistance was obtained as well as excellent magneto-optical characteristics. In contrast, in sample 40, the content of Cu was too high, and in sample 41, the content of Cr was too high.

EXAMPLE 12

A quaternary alloy film containing 3 to 14 atom% of Si and having a thickness of 1500 Å was prepared in the same manner as described in Example 7. The magneto-optical characteristics and the crystallization temperature were determined. Incidentally, the crystallization temperature (Tcry) was determined from the point of initiation of the exothermic peak measured by a differential thermal analyzer at a temperature-elevation rate of 10° C./min. The obtained results are shown in Table J.

TABLE J

| Sample No. | Composition (atomic ratio) | Squareness Ratio of Kerr Hysteresis Loop | Kerr Rotation Angle θk (deg) | Coercive Force Hc (KOe) | Curie Temperature Tc (°C.) | Increase ΔTcry (°C.) of Crystallization Temperature |
| --- | --- | --- | --- | --- | --- | --- |
| 42 | (Gd$_{0.6}$Dy$_{0.4}$)$_{0.20}$Fe$_{0.80}$ | good | 0.315 | 2.2 | 195 | 0 |
| 43 | {(Gd$_{0.6}$Dy$_{0.4}$)$_{0.20}$Fe$_{0.80}$}$_{0.94}$Si$_{0.03}$ | good | 0.313 | 1.4 | 198 | 45 |
| 44 | {(Gd$_{0.6}$Dy$_{0.4}$)$_{0.20}$Fe$_{0.80}$}$_{0.94}$Si$_{0.06}$ | good | 0.305 | 1.0 | 191 | 96 |
| 45 | {(Gd$_{0.6}$Dy$_{0.4}$)$_{0.20}$Fe$_{0.80}$}$_{0.91}$Si$_{0.09}$ | good | 0.290 | 0.7 | 184 | 147 |
| 46 | {(Gd$_{0.6}$Dy$_{0.4}$)$_{0.20}$Fe$_{0.80}$}$_{0.86}$Si$_{0.14}$ | bad | 0.100 | 0.0 | 180 | 151 |

As is apparent from the results shown in Table J, in samples 43 through 45, the crystallization temperature could be increased by up to about 150° C. while the Kerr rotation angle, coercive force and Curie temperature were maintained at practically satisfactory levels.

We claim:

1. A magneto-optical recording element comprising a substrate and an amorphous magnetic film formed on the substrate and having an easy magnetization axis in the direction perpendicular to the film surface, wherein the magnetic film comprises an alloy having an atomic composition represented by the following formula:

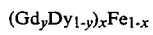

$$(Gd_yDy_{1-y})_xFe_{1-x}$$

wherein x is a number of from 0.15 to 0.35 and y is a number of from 0.30 to 0.95; said alloy film has a Curie point (Tc) higher than 175° C. and a coercive force of at least 1.0 KOe; wherein the nuclear magnetic field (Hn), coercive force (Hc) and saturation magnetic field (Hs) in the Kerr hysteresis loop are substantially equal at temperatures higher than 100° C. but lower than the Curie point (Tc) of the ternary alloy film.

2. A magneto-optical recording element as set forth in claim 1, wherein x in the formula is a number of from 0.18 to 0.33.

3. A magneto-optical recording element as set forth in claim 1, wherein y in the formula is a number of from 0.5 to 0.85.

4. A magneto-optical recording element as set forth in claim 1, wherein x in the formula is a number of from 0.23 to 0.35 and the recording element is used for magnetic field modulation recording.

5. A magneto-optical recording element according to claim 1, wherein x is a number of from 0.19 to 0.215 and y is a number of from 0.30 to 0.95.

6. A magneto-optical element according to claim 1, wherein said magnetic film is formed by sputtering.

7. A magneto-optical recording element as set forth in claim 1, wherein the magnetic film has a thickness of 500 to 1500 Å.

8. A magneto-optical recording element as set forth in claim 1, wherein Cr as a first additive component and at least one element selected from the group consisting of Ti, Cu, Ag, Sb and Ni as a second additive component are incorporated in the ternary alloy film.

9. A magneto-optical recording element as set forth in claim 8, wherein the first additive component is incorporated in an amount of 0.5 to 5 atom% based on the magnetic film and the second additive element is incorporated in an amount of 3 to 15 atom% based on the magnetic film.

10. A magneto-optical recording element as set forth in claim 1, wherein a first additive element selected from the group consisting of Cu and Ti and a second additive element selected from the group consisting of Ag, Sb and Ni are incorporated into the ternary alloy film.

11. A magneto-optical recording element as set forth in claim 10, wherein the first additive element is incorporated in an amount of 3 to 20 atom% based on the magnetic film and the second additive element is incorporated in an amount of 3 to 15 atom% based on the magnetic film.

12. A magneto-optical recording element as set forth in claim 1, wherein Si is incorporated in the ternary alloy film.

13. A magneto-optical recording element as set forth in claim 12, wherein Si is incorporated in an amount of 1 to 10 atom% based on the magnetic film.

14. A magneto-optical recording element comprising a substrate and an amorphous magnetic film formed on the substrate and having an easy magnetization axis in the direction perpendicular to the film surface, wherein the magnetic film consists essentially of (i) an alloy having an atomic composition represented by the following formula:

$$(Gd_yDy_{1-y})_xFe_{1-x}$$

wherein x is a number of from 0.15 to 0.35 and y is a number of from 0.30 to 0.95, (ii) a first additive component of Cr is an amount of 0.5 to 5 atom% based on the magnetic film and (iii) a second additive component selected from the group consisting of Ti, Cu, Ag, Sb and Ni in an amount of 3 to 15 atom% based on the magnetic film, said film has a Curie point (Tc) higher than 175° C. and a coercive force of at least 1.0 KOe, wherein the nuclear magnetic field (Hn), coercive force (Hc) and saturation magnetic field (Hs) in the Kerr hysteresis loop are substantially equal at temperatures higher than 100° C. but lower than the Curie point (Tc) of the alloy film.

15. A magneto-optical recording element according to claim 14, wherein x is a number of from 0.21 to 0.22 and y is a number of from 0.60 to 0.62.

16. A magneto-optical recording element comprising a substrate and an amorphous magnetic film formed on the substrate and having an easy magnetization axis in the direction perpendicular to the film surface, wherein the magnetic film consists essentially of (i) an alloy having an atomic composition represented by the following formula:

$$(Gd_yDy_{1-y})_xFe_{1-x}$$

wherein x is a number of from 0.15 to 0.35 and y is a number of from 0.30 to 0.95, (ii) a first additive element selected from the group consisting of Cu and Ti in an amount of 3 to 20 atom% base on the magnetic film and (iii) a second additive element selected from the group consisting of Ag, Sb and Ni in an amount of 3 to 15 atom% based on the magnetic film, said film has a Curie point (Tc) higher than 175° C. and a coercive force of at least 1.0 KOe, wherein the nuclear magnetic field (Hn), coercive force (Hc) and saturation magnetic field (Hs) in the Kerr hysteresis loop are substantially equal at temperatures higher than 100° C. but lower than the Curie point (Tc) of the alloy film.

17. A magneto-optical recording element according to claim 16, wherein x is a number of about 0.20 and y is a number of about 0.60.

18. A magneto-optical recording element comprising a substrate and an amorphous magnetic film formed on the substrate and having an easy magnetization axis in the direction perpendicular to the film surface, wherein the magnetic film consists essentially of (i) an alloy having an atomic composition represented by the following formula:

$$(Gd_yDy_{1-y})_xFe_{1-x}$$

wherein x is a number of from 0.15 to 0.35 and y is a number of from 0.30 to 0.95, and (ii) Si in an amount of 1 to 10 atom% based on the magentic film, said film has a Curie point (Tc) higher than 175° C. and a coercive force of at least 0.1 KOe, wherein the nuclear magnetic field (Hn), coercive force (Hc) and saturation magnetic field (Hs) in the Kerr hysteresis loop are substantially equal at temperatures higher than 100° C. but lower than the Curie point (Tc) of the alloy film.

19. A magneto-optical element according to claim 18, wherein x is a number of about 0.2 and y is a number of about 0.6.

* * * * *